(12) United States Patent
Nagase et al.

(10) Patent No.: US 8,147,595 B2
(45) Date of Patent: Apr. 3, 2012

(54) MEMBRANE MATERIAL FOR GAS HOLDER AND GAS HOLDER USING THE SAME

(75) Inventors: Satoshi Nagase, Ibaraki (JP); Hiroyuki Mori, Ibaraki (JP); Mikio Kusaka, Osaka (JP); Yasuo Motoishi, Osaka (JP)

(73) Assignees: Teijin Fibers Limited, Osaka (JP); Skypia Co., Ltd., Osaka (JP)

( * ) Notice: Subject to any disclaimer, the term of this patent is extended or adjusted under 35 U.S.C. 154(b) by 629 days.

(21) Appl. No.: 12/304,939

(22) PCT Filed: Jun. 11, 2007

(86) PCT No.: PCT/JP2007/061694
§ 371 (c)(1),
(2), (4) Date: Dec. 15, 2008

(87) PCT Pub. No.: WO2007/145153
PCT Pub. Date: Dec. 21, 2007

(65) Prior Publication Data
US 2009/0173229 A1    Jul. 9, 2009

(30) Foreign Application Priority Data
Jun. 14, 2006   (JP) .................................. 2006-164181

(51) Int. Cl.
*B01D 53/22* (2006.01)
*B65B 1/14* (2006.01)
*F17C 1/16* (2006.01)

(52) U.S. Cl. ........ 96/4; 96/11; 96/12; 206/0.6; 220/586; 220/589; 138/141; 428/411.1; 428/521; 428/523

(58) Field of Classification Search .................. 96/4, 11, 96/12; 95/45; 206/0.6; 220/586, 589; 138/140, 138/141; 428/411.1, 521, 523
See application file for complete search history.

(56) References Cited

U.S. PATENT DOCUMENTS

| | | | | |
|---|---|---|---|---|
| 3,705,645 | A | * | 12/1972 | Konen ........................... 206/0.6 |
| 5,384,172 | A | * | 1/1995 | Takado et al. .................. 206/0.6 |
| 6,989,198 | B2 | * | 1/2006 | Masuda et al. ................. 220/586 |
| 7,722,701 | B2 | * | 5/2010 | Nehez ................................ 95/45 |
| 7,878,453 | B2 | * | 2/2011 | Liggett ........................ 244/126 |
| 2006/0068158 | A1 | * | 3/2006 | Howland ....................... 428/105 |
| 2008/0121643 | A1 | * | 5/2008 | Blencoe et al. ................ 220/589 |

FOREIGN PATENT DOCUMENTS

| JP | 2003-74797 | * | 3/2003 |
|---|---|---|---|
| JP | 2003-74797 A | | 3/2003 |
| JP | 2005-119232 | * | 5/2005 |
| JP | 2005-119232 A | | 5/2005 |
| JP | 2006-22938 | * | 1/2006 |
| JP | 2006-22938 A | | 1/2006 |

* cited by examiner

*Primary Examiner* — Jason M Greene
(74) *Attorney, Agent, or Firm* — Sughrue Mion, PLLC

(57) ABSTRACT

There is provided a membrane material for a gas holder having abrasion resistance and flex resistance usable as a gas holder, in addition to strength of a base fabric, and having high gas barrier properties. A membrane material for a gas holder, which is used in a gas holder for storing or recovering gas, includes at least 4 layers of a protective layer, a base fabric layer, a gas barrier layer and a protective layer laminated in this order.

16 Claims, 1 Drawing Sheet

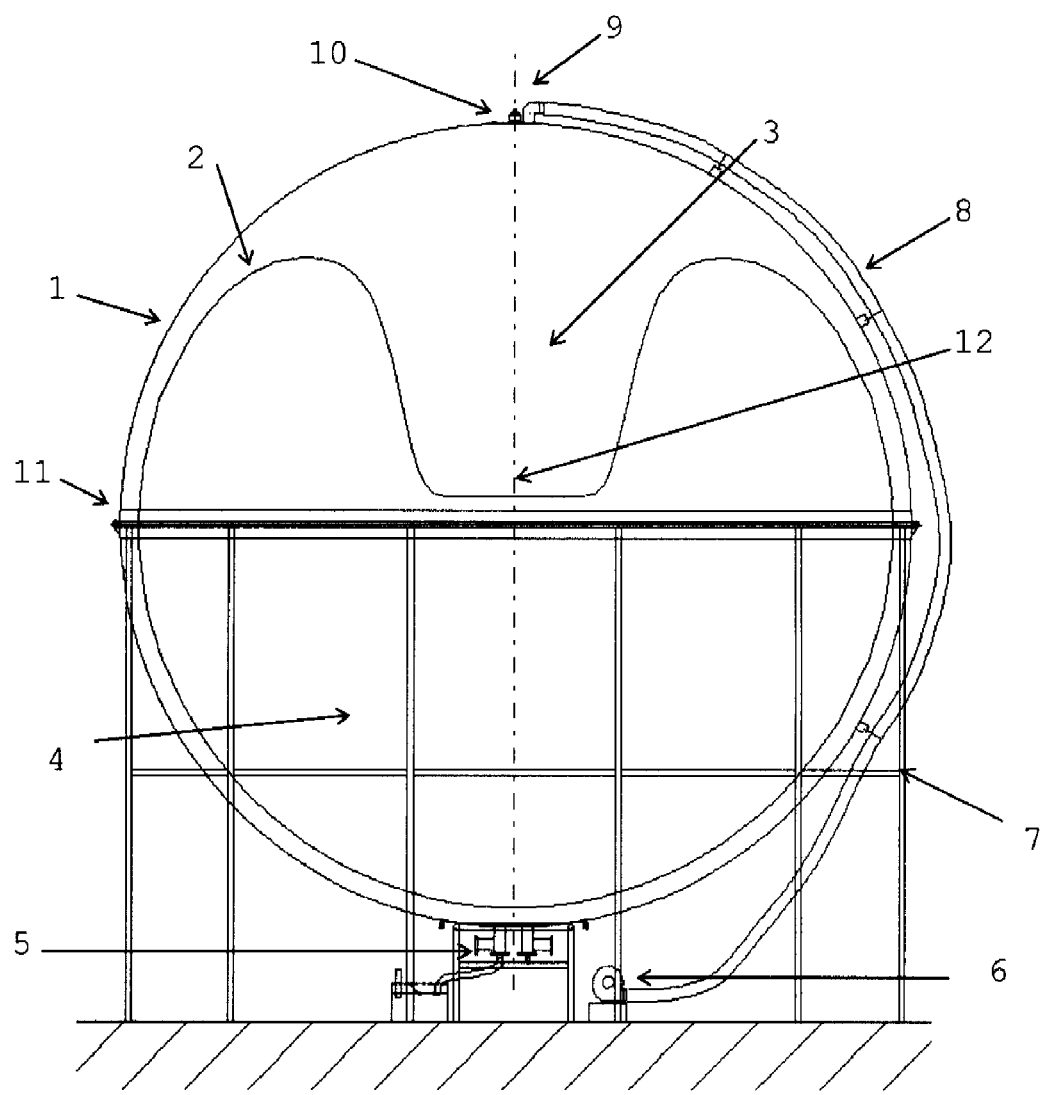

MEMBRANE MATERIAL FOR GAS HOLDER AND GAS HOLDER USING THE SAME

TECHNICAL FIELD

The present invention relates to particularly a membrane material for a large-sized gas holder, and to a membrane material suitable for constructing a gas tank for storing city gas, particular gas or the like and a biogas processing facility for generating methane gas, pyrolysis gas or the like from organic wastes such as wastes from livestock production and fisheries facilities and raw garbage.

BACKGROUND ART

Gas tanks made of reinforced plastic or metal have been used in storage facilities of waste gas in iron works, low-pressure fuel gas or the like. Further, at present, attention has been given to biogas processing facilities for recovering methane gas and the like generated from general sewage disposal and pastoral waste disposal facilities, disposal facilities of raw garbage, distilled spirit lees, soy lees or the like, and the like, and utilizing it as energy, and to facilities for making efficient use of gas generated by pyrolysis of organic wastes. In particular, in recent years, according to the needs of the age, new construction of these facilities has increased, and at the same time, an increase in size of the respective facilities has progressed. In these fields, equipment for storing and recovering gas has been expected to be constructed more economically by high-strength and lightweight membrane materials. For example, there is patent document 1 relating to a membrane gas holder. In this document, there is described a box storage type membrane gas holder having a structure that a gas storage bag formed by a bag body made of a flexible membrane material having air tightness and liquid tightness and capable of taking gas in and out is accommodated in a rigid-structure box made of a reinforced plastic material, a metal material or the like. In this document, particularly, no reference is made to a material used in the membrane material for the gas holder, and only a system of the membrane gas holder is described.

On the other hand, as a conventional gas barrier membrane material, there is described in patent document 2 a gas barrier membrane material in which a coating film having transparency obtained by providing an anchor coat layer on at least one surface of a polymer film substrate as needed and forming thereon in turn a thin metal or metal compound membrane layer and a protective layer as needed and a heat-sealable resin are adhered to each other through a gas barrier adhesive containing inorganic ultrafine particles.

Herein, there is a description of the membrane material having excellent gas barrier properties as a highly gas barrier membrane material by filling minute pinhole portions in a thin membrane layer with the ultra finely dispersed inorganic material contained in the barrier adhesive and as a laminated body in which permeation of a large amount of gas from cracks and broken portions of the thin membrane layer which has occurred to expansion and contraction of the film occurring at the time of lamination with another substrate and thermal stress due to heat shock can be inhibited by the adhesive layer. However, use of this invention is a packaging material. Although it is possible to secure gas barrier properties by this membrane material alone, it has been difficult to obtain strength enough to be tolerable in practical use of the membrane material for a gas holder which is use of the present invention.

Further, in patent document 3, there are described an ultra lightweight membrane material having two layers of a base fabric and a gas barrier layer and an ultra lightweight membrane material comprising a resin layer, a base fabric layer and a gas barrier layer.

Use of this invention is a baronet or a diaphragm used in the inside of an airship, and it has been difficult to obtain abrasion resistance and flex resistance enough to be tolerable in practical use.

Patent Document 1: JP-A-2005-48930
Patent Document 2: JP-A-2000-006304
Patent Document 3: JP-A-2005-119232

DISCLOSURE OF THE INVENTION

Problems that the Invention is to Solve

An object of the present invention is to provide a membrane material for a gas folder having abrasion resistance and flex resistance usable as a gas holder, in addition to strength of a base fabric, and having high gas barrier properties.

Means for Solving the Problems

The present invention relates to a membrane material for a gas holder, which is used in a gas holder for storing or recovering gas, comprising at least 4 layers of a protective layer, a base fabric layer, a gas barrier layer and a protective layer laminated in this order.

It is preferred that at least one protective layer constituting the membrane material herein comprises a polyolefin resin.

Further, it is preferred that the above-mentioned base fabric is a woven fabric, and that the product of the fineness (dtex) of yarns and the density (the number of yarns per inch) (ends/inch) thereof is from 2,500 to 5,000.

Furthermore, it is preferred that the above-mentioned base fabric comprises a film-like polyurethane resin layer laminated on one surface or both surfaces thereof, and that the polyurethane resin layer has a thickness of 5 to 50 μm.

Next, the present invention relates to a gas holder comprising the above-mentioned membrane material for a gas holder.

Advantages of the Invention

According to the present invention, there can be provided a membrane material having abrasion resistance and flex resistance usable as a gas holder, in addition to strength of a base fabric, and having high gas barrier properties. By using this, equipment for storing and recovering gas can be constructed more economically by the high-strength and lightweight membrane material.

BRIEF DESCRIPTION OF THE DRAWINGS

FIG. 1 is a view showing an example in which a membrane material of the present invention is used for a gas holder.

DESCRIPTION OF REFERENCE NUMERALS AND SIGNS

| | |
|---|---|
| 1 | Gas Holder Outer Membrane |
| 2 | Gas Holder Inner Membrane |
| 3 | Air Chamber |
| 4 | Gas Chamber |

-continued

| | |
|---|---|
| 5 | Lower Nozzle |
| 6 | Blower |
| 7 | Steel Frame |
| 8 | Fan Duct |
| 9 | Upper Nozzle |
| 10 | Ultrasonic Distance Meter |
| 11 | Equatorial Portion |
| 12 | Top Portion (Weight) |

BEST MODE FOR CARRYING OUT THE INVENTION

In the present invention, it is important to use a base fabric as a layer for expressing the strength of a membrane material. The strength of each fiber is put together in the same direction by forming the fabric, thereby being able to obtain the high-strength membrane material.

The configurations of the base fabrics include but are not limited to a woven fabric, a knitted fabric, a nonwoven fabric, a UD sheet and the like. However, for the reason as described above, it is preferred that the woven fabric and UD sheet which are most easy to express the strength of the fibers constituted are used. In the case of the woven fabric, the configuration thereof is preferably a plain weave fabric which is easy to express the strength. In order to improve not only the strength but also the tearing strength, it is also possible to introduce a lip structure.

Also for a material used, any one of a natural fiber and a synthetic fiber can be used. However, in order to obtain the membrane material having a higher strength than this, the synthetic fiber is preferably used. Specifically, there can be used polyester, nylon, carbon fiber, aramid fiber, glass fiber and the like. In respect to the strength, so-called super fibers represented by aramid fiber are preferably used. However, in respect to cost performance, polyester and nylon are considered to be comprehensively preferred.

When the base fabric used in the present invention is the woven fabric, it is necessary that the product of the fineness (dtex) of yarns constituting the base fabric and the density (ends/inch) thereof is from 2,500 to 5,000, and preferably from 4,000 to 5,000, and that yarn distortion (MEZURE) is less than 10 mm, and preferably 5 mm or less.

When the product of the fineness (dtex) and the density (ends/inch) is less than 2,500, spaces largely open between yarns to have a high degree of potential for the occurrence of the yarn distortion. It is necessary that the yarn distortion is less than 10 mm. When it is 10 mm or more, appearance quality of a product is deteriorated, resulting in the easy occurrence of processing defects such as folds and creases and pinholes which are serious defects for the gas holder membrane material. When the gas holder is formed, stress is concentrated to the defect portions, and these defects cause puncture in some cases. Further, the yarn distortion not only causes these defects, but also decreases the rate of expression of the strength, resulting in failure to achieve the object of the present invention. In order to make the yarn distortion less than 10 mm, what is necessary is just to make the product of the fineness of yarns constituting the base fabric and the density thereof 2,500 or more as described above.

Furthermore, the fabric usually goes through a refining process, in order to remove impurities such as an oil adhered in a spinning process and a size adhered in a warping process for weaving preparation, after weaved on a loom. In that case, it is extremely useful to use a jigger dyeing machine, in order to inhibit this yarn distortion.

On the other hand, when the product of the fineness (dtex) and the density (ends/inch) exceeds 5,000, the weight of the base fabric increases, and becomes too large to be used for the membrane material for a gas holder which is the main object of the present invention.

Incidentally, the base fabric layer is laminated with a film-like polyurethane resin layer on at least one surface thereof, that is to say, one surface or both surfaces thereof, thereby improving surface smoothness to improve adhesiveness between the gas barrier layer and the polyolefin layer as the protective layer, which makes the multilayer membrane material firm by integration and more improves flex resistance of the membrane material. Further, the base fabric layer becomes easy to handle, leading to an improvement in processing properties of the gas barrier layer or the protective layer. In this case, the thickness of the film-like polyurethane resin layer is usually from 5 to 50 μm, and preferably from 10 to 20 μm. When the thickness of the polyurethane resin layer is less than 5 μm, the surface smoothness is not sufficiently satisfied, resulting in failure to sufficiently obtain improvement in adhesiveness. In addition that, it causes defects such as folds and creases in processing of the gas barrier layer and the protective layer in some cases. On the other hand, when the thickness of the polyurethane resin layer exceeds 50 μm, the weight of the base fabric increases, and becomes too large to be used for the membrane material for a gas holder which is the main object of the present invention.

Then, in the present invention, the membrane material is required to have the gas barrier layer on one surface of the above-mentioned base fabric layer. As has hitherto been described, the gas holder is a member for recovering methane gas or pyrolysis gas generated from wastes or storing city gas or particular gas, and a material used therein requires gas barrier properties. The gas barrier layer is not particularly limited, and there is used a polyester film, a polyethylene naphthalate film, a polyamide film, a polyvinylidene chloride film, an ethylene-vinyl alcohol copolymer film or the like. Above all, the ethylene-vinyl alcohol copolymer film is particularly preferred because of its excellent gas barrier properties. In particular, a large amount of hydrogen which easily passes the membrane is contained in the pyrolysis gas. In order to prevent leakage thereof, it is effective to use the ethylene-vinyl alcohol copolymer film. Further, one in which a metal or a metal oxide is vapor-deposited on the above-mentioned each film is also effective in terms of more improving gas barrier properties.

On the other hand, in order to improve the membrane material to a more practical level, it is necessary to protect the base fabric layer and the gas barrier layer with another resin layer. The membrane material provided in the present invention is used as the membrane material for a gas holder, so that it should not be damaged or broken during use in order to maintain gas barrier properties. Further, in order to correspond to the shape of the gas holder, flex resistance is required. It is therefore extremely useful in terms of maintaining functions of the membrane material and making it easy to construct the gas holder to coat the base fabric layer for maintaining strength and the gas barrier layer with the resin (protective layer) or to laminate them with a film of the resin. Furthermore, when the gas holder is constructed, it is also desirable to provide such a layer in order to weld the membrane materials to each other.

As the resin used for the protective layer, there is used a polyethylene resin, a polyurethane resin (excepting the above-mentioned film-like polyurethane resin previously laminated on the base fabric), a vinyl chloride resin, an acrylic resin, a polyester resin or the like. Here, in order to obtain the membrane material having flex resistance, it is suitable to use the polyurethane resin having high flex resistance. Further, in order to impart abrasion resistance to the membrane material, a polyolefin resin layer such as polyethylene is preferably provided on the polyurethane resin. Furthermore, a mixture of hydrogen sulfide and other miscellaneous compounds is contained in gas generated from the wastes. Accordingly, also in order to prevent deterioration of the membrane material, the polyolefin such as polyethylene which is chemically stable is desirably used as the protective layer. These resins are each processed by a common process, and laminated as a film-like resin by using an adhesive, or directly applied as a heated resin.

Incidentally, the basis weight of the base fabric layer is usually from 20 to 100 g/m$^2$, and preferably from 30 to 60 g/m$^2$.

Further, the thickness of the gas barrier layer is usually from 3 to 30 μm, and preferably from 5 to 15 μm.

Furthermore, the thickness of the protective layer used on the base fabric layer side or the gas barrier layer side is usually from 5 to 180 μm, and preferably from 10 to 100 μm.

The total thickness of the membrane material for a gas holder of the present invention having the above-mentioned constitution is usually from 150 to 300 μm, and preferably from 200 to 250 μm.

In the membrane material for a gas holder of the present invention, the respective layers of the protective layer/base fabric layer/gas barrier layer/protective layer may be adhered to each other with an adhesive such as a urethane-based adhesive by using an adhesion means such as a common dry laminate method, extrusion coating laminate method or wet laminate method. Further, also when the protective layer comprises the plurality of layers as described above, a similar adhesion means is employed.

The amount of the adhesive applied herein between the respective layers is usually from 0.01 to 10 g/m$^2$, and preferably from about 1 to 5 g/m$^2$, by dry weight.

Then, the gas holder using the above-mentioned membrane material will be described below with reference to FIG. 1.

The spherical membrane gas holder is composed of an outer membrane 1 and an inner membrane 2, and the outer membrane and the inner membrane are firmly bound at many places in the periphery of a central portion (an equatorial portion 11) of the sphere. Further, the outer membrane 1 is firmly bound to a steel frame 7 at many places in the equatorial portion 11.

The spherical membrane gas holder is partitioned into an air chamber 3 and a gas chamber 4 by the inner membrane 2. Gas enters and leaves through a lower nozzle 5, and air enters and leaves the air chamber 3 through a blower 6, a fun duct 8 and an upper nozzle 9.

The design is made so that a predetermined or higher pressure is applied to the air chamber 3 by the blower 6 to maintain the spherical shape of the gas holder, even when external force such as wind or accumulation of snow acts, thereby withstanding the external force.

Further, a weight of the membrane material, a plastic or the like is attached to a top portion 12 of the inner membrane 2, and vertically moves according to increase and decrease in the amount of gas stored. This vertical distance is measured with an ultrasonic distance meter 10 or the like mounted on the top portion 12 of the outer membrane, thereby being able to measure the amount of gas stored.

The air chamber 3 and the gas chamber 4 are balanced in pressure through the inner membrane 2, so that usually, excessive tension does not act on the inner membrane 2. However, a pool of water is formed on an upper portion of the top portion (weight) 12 due to dew formation in some cases. In this case, large tension acts on the inner membrane 2 or the firmly bound portion 11 of the inner membrane and the outer membrane. In particular, when the gas holder becomes large in size, there is an increased possibility that the membrane material is broken by this cause. Use of the membrane material for a gasholder of the present invention as the above-mentioned inner membrane 2 makes it possible to more economically construct the gas holder for storing and recovering gas, which is excellent in abrasion resistance, flexibility and gas barrier properties.

EXAMPLES

The present invention will be described in more detail with reference to the following examples. Physical properties in the examples were measured by the following methods.

(1) Gas Permeability

This was evaluated by the gas permeability test (JIS K7126A method). Oxygen was used as a measurement gas.

(2) Abrasion Resistance and Flex Resistance

After the crease-flex test (JIS K6404) was performed, the gas permeability test (JIS K7126A method) was performed. The number of cycles of flexing was 5,000 cycles, and oxygen was used as a measurement gas in the gas permeability test.

Examples 1 to 5 and Comparative Examples 1 to 4

Using polyester multifilament yarns of 44 dtex/20 filaments (manufactured by Teijin Fibers Ltd., P300SB), a plain weave fabric (basis weight: 90 g/m$^2$) having a warp density of 110.0 ends/inch and a weft density of 92.5 ends/inch was prepared. A polyurethane film (PU) (manufactured by Okura Industrial Co., Ltd., Kuramilon, thickness: 10 μm) was laminated on one surface of this woven fabric to form a base fabric. A 15 μm thick ethylene-vinyl alcohol copolymer film (manufactured by Kuraray Co., Ltd., Evarl Film EF-XL) was laminated on the polyurethane-laminated side of this base fabric to obtain a two-layer membrane comprising a base fabric layer and a gas barrier layer. Further, each of both surfaces of the resulting two-layer membrane was laminated with one layer of a polyvinyl chloride film (PVC) (manufactured by Mitsubishi Chemical MKV Company, Artoron), a polyethylene terephthalate film (PET) (manufactured by Toray Industries Inc., Lumilar), a polyurethane film (PU) (manufactured by Okura Industrial Co., Ltd., Kuramilon) and a polyethylene film (PE) (manufactured by Tohcello Co., Ltd., TUX), respectively, each of which had a thickness of 10 μm, using an urethane-based adhesive (5 g/m$^2$) (manufactured by Takeda Pharmaceutical Co., Ltd., Takelac). Four-layer membranes obtained above were taken as Examples 1 to 4.

Further, in Example 5, a polyurethane film (PU) (manufactured by Okura Industrial Co., Ltd., Kuramilon, thickness: 10 μm) was laminated on each of both surfaces of the above-mentioned woven fabric to form a base fabric, and a 15 μm thick ethylene-vinyl alcohol copolymer film (manufactured by Kuraray Co., Ltd., Evarl Film EF-XL) was laminated on this base fabric to obtain a two-layer membrane comprising a base fabric layer and a gas barrier layer. Further, a 10 μm thick polyethylene film (PE) (manufactured by Tohcello Co., Ltd., TUX) was laminated on each of both surfaces of the resulting two-layer membrane, using an urethane-based adhesive (5 g/m$^2$) (manufactured by Takeda Pharmaceutical Co., Ltd., Takelac).

On the other hand, as Comparative Examples 1 to 4, there were prepared the base fabric alone used in Examples 1 to 4, and ones obtained by laminating the base fabrics, on one surface thereof, with an ethylene-vinyl alcohol copolymer film (manufactured by Kuraray Co., Ltd., Evarl Film EF-XL), a polyurethane film (PU) (manufactured by Okura Industrial Co., Ltd., Kuramilon) and a polyethylene film (PE) (manufactured by Tohcello Co., Ltd., TUX), respectively, each of which had a thickness of 15 μm, using an urethane-based adhesive (15 g/m$^2$) (manufactured by Takeda Pharmaceutical Co., Ltd., Takelac). Physical properties of Examples are shown in Table 1, and physical properties of Comparative Examples are shown in Table 2.

TABLE 1

|  | Example 1 | Example 2 | Example 3 | Example 4 | Example 5 |
|---|---|---|---|---|---|
| Gas Barrier Layer | Provided | Provided | Provided | Provided | Provided |
| Base Fabric Layer | One surface, PU | One surface, PU | One surface, PU | One surface, PU | Both surfaces, PU |
| Protective Layer (Both Surfaces) | PVC | PET | PU | PE | PE |
| Gas Permeability (cc/m$^2$ · 24 hours · atm) | 13 | 15 | 3 | 8 | Less than 1 |
| Gas Permeability after Crease-Flex Test (cc/m$^2$ · 24 hours · atm) | 34 | 18 | 11 | 9 | Less than 1 |

TABLE 2

|  | Comparative Example 1 | Comparative Example 2 | Comparative Example 3 | Comparative Example 4 |
|---|---|---|---|---|
| Gas Barrier Layer | Not provided | Provided | Not provided | Not provided |
| Base Fabric Layer | One surface, PU | One surface, PU | One surface, PU | One surface, PU |
| Protective Layer (Both Surfaces) | Not provided | Not provided | PU | PE |
| Gas Permeability (cc/m$^2$ · 24 hours · atm) | 213 | 24 | 53 | 71 |
| Gas Permeability after Crease-Flex Test (cc/m$^2$ · 24 hours · atm) | 260 | 60 | 159 | 80 |

INDUSTRIAL APPLICABILITY

According to the present invention, there can be provided a membrane material having abrasion resistance and flex resistance usable as a gas holder, in addition to strength of a base fabric, and having high gas barrier properties. By using this, equipment for storing and recovering gas can be constructed more economically by the high-strength and lightweight membrane material. The invention has therefore an extremely high industrial utility value.

The invention claimed is:

1. A membrane material for a gas holder, which is used in a gas holder for storing or recovering gas, comprising at least 4 layers of a protective layer, a base fabric layer, a gas barrier layer and a protective layer laminated in this order,
    wherein at least one protective layer constituting the membrane material comprises a polyolefin resin,
    wherein a film-like polyurethane resin layer is laminated on one surface or both surfaces of the base fabric layer.

2. The membrane material for a gas holder according to claim 1, wherein the base fabric is a woven fabric, and the product of the fineness (dtex) of yarns and the density (ends/inch) thereof is from 2,500 to 5,000.

3. The membrane material for a gas holder according to claim 1, wherein the polyurethane resin layer has a thickness of 5 to 50 μm.

4. A gas holder comprising the membrane material for a gas holder according to claim 1.

5. The membrane material for a gas holder according to claim 2, wherein the polyurethane resin layer has a thickness of 5 to 50 μm.

6. A gas holder comprising the membrane material for a gas holder according to claim 2.

7. A gas holder comprising the membrane material for a gas holder according to claim 3.

8. A gas holder comprising the membrane material for a gas holder according to claim 5.

9. The membrane material for a gas holder according to claim 1, wherein the gas barrier layer is at least laminated on the film-like polyurethane resin layer-laminated side of the base fabric layer.

10. The membrane material for a gas holder according to claim 1, wherein a resin used for the protective layer is at least one selected from the group consisting of a polyethylene resin, a polyurethane resin (excepting the film-like polyurethane resin previously laminated on the base fabric layer), a vinyl chloride resin, an acrylic resin and a polyester resin.

11. The membrane material for a gas holder according to claim 2, wherein a material used for the woven fabric is at least one selected from the group consisting of a polyester, a nylon, a carbon fiber, an aramid fiber and a glass fiber.

12. The membrane material for a gas holder according to claim 1, wherein a film used for the gas barrier layer is at least one selected from the group consisting of a polyethylene naphthalate film, a polyamide film, a polyvinylidene chloride film and an ethylene-vinyl alcohol copolymer film.

13. The membrane material for a gas holder according to claim 1, wherein a basis weight of the base fabric layer is from 20 to 100 g/m$^2$.

14. The membrane material for a gas holder according to claim 1, wherein a thickness of the gas barrier layer is from 3 to 30 μm.

15. The membrane material for a gas holder according to claim 1, wherein a thickness of the protective layer used on the base fabric layer side or the gas barrier layer side is from 5 to 180 μm.

16. The membrane material for a gas holder according to claim 1, wherein a total thickness of the membrane material is from 150 to 300 μm.

* * * * *